United States Patent [19]
Chen

[11] Patent Number: 5,947,058
[45] Date of Patent: Sep. 7, 1999

[54] AQUARIUM PUMPING SYSTEM HAVING ENOUGH SUCTION HEAD

[76] Inventor: Ku-Pao Chen, 5Fl., No. 15, Lane 50, Huan-Ho S. Road, Sec. 2, Taipei, Taiwan

[21] Appl. No.: 09/071,565

[22] Filed: May 1, 1998

[51] Int. Cl.⁶ .................................................. A01K 63/04
[52] U.S. Cl. ........................... 119/261; 119/249; 210/110
[58] Field of Search ................................... 119/261, 249, 119/254, 255, 263; 222/401; 210/416.2

[56] References Cited

U.S. PATENT DOCUMENTS

| | | | |
|---|---|---|---|
| 2,293,051 | 8/1942 | Duffy | 210/124 |
| 4,894,149 | 1/1990 | Block | 210/101 |
| 4,915,828 | 4/1990 | Meyers et al. | 210/110 |
| 5,139,659 | 8/1992 | Scott | 210/169 |
| 5,164,089 | 11/1992 | Preston | 210/615 |
| 5,672,268 | 9/1997 | Mizrahi et al. | 210/110 |

*Primary Examiner*—Peter M. Poon
*Assistant Examiner*—Yvonne R. Abbott

[57] ABSTRACT

An aquarium pumping system includes: a container having a pump installed in the container and having sand filled in the container, a discharge tube connected between the container and an aquarium for delivering water into the aquarium, a suction tube connected between an aquarium and a suction port of the pump with the suction tube having an inlet aperture formed in the suction tube and constantly submerged in the container under a water level within the container to obtain an enough net positive suction head (NPSH) of the pump, and a gas tube connected to the container for supplying carbon dioxide gas into the container to react with calcium carbonate in the sand to form calcium ions which will be dissociated into the water delivered into the aquarium for raising fish, coral or other animals in the aquarium.

8 Claims, 7 Drawing Sheets

AQUARIUM PUMPING SYSTEM HAVING ENOUGH SUCTION HEAD

BACKGROUND OF THE INVENTION

Figure 1:
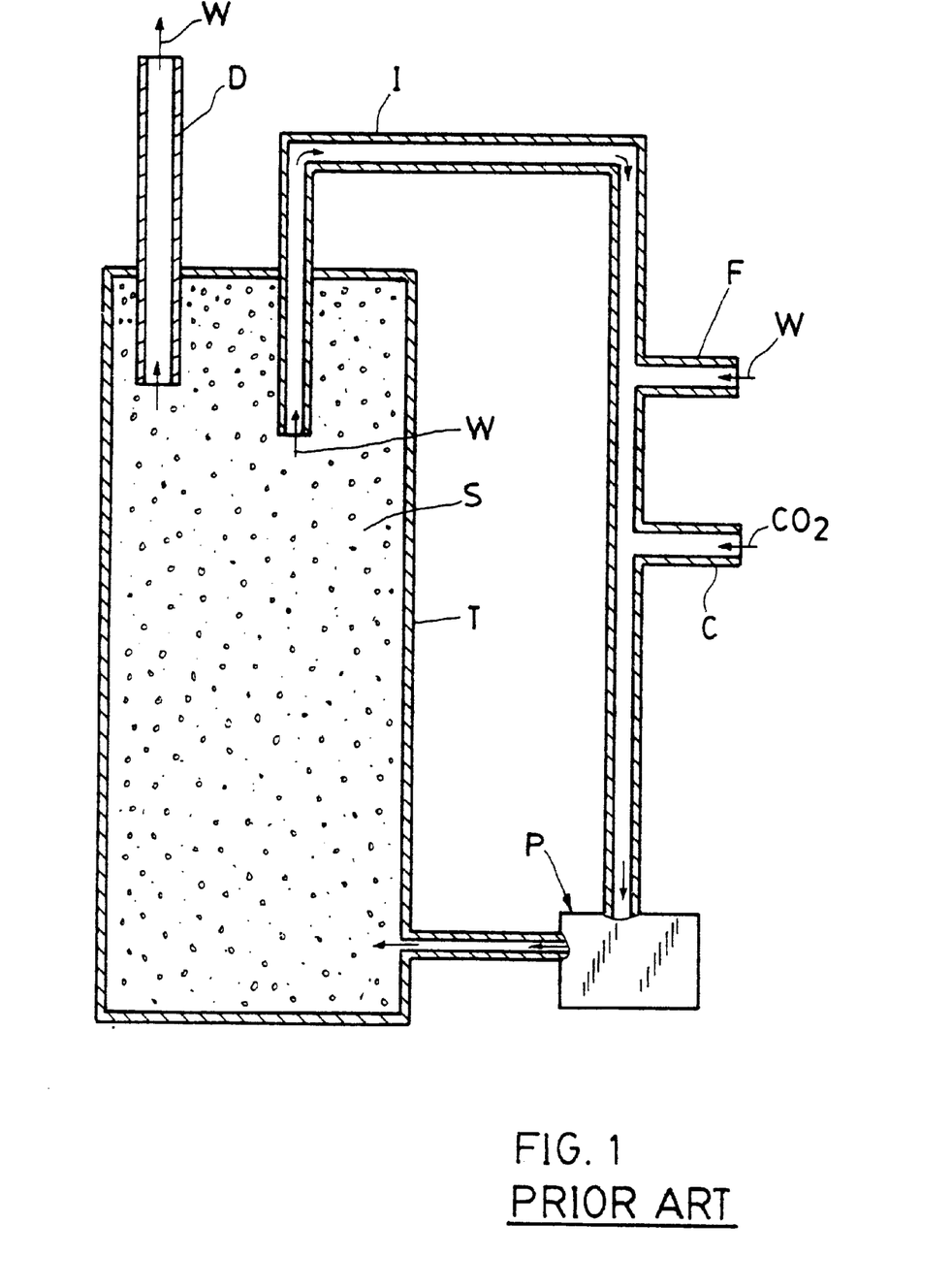
FIG. 1 shows a conventional water pumping system for aquarium.

A conventional water pumping system as shown in FIG. 1 includes: a tank T filled with sand S therein, a pump P having a suction tube I connected with the tank T and connected with a feed tube F for feeding water therein and with a gas tube C for supplying carbon dioxide therein, and a discharge tube D connected between the tank T and an aquarium (not shown) for delivering water W containing calcium ion into the aquarium for raising fish.

However, such a conventional water pumping system for aquarium has the following drawbacks:

1. A gigantic piping system should be provided for assembling the individual elements including the pump, the tank, the tubes and parts, and the aquarium, thereby increasing installation cost, maintenance problem and occupying a big volume.
2. The location or position for mounting the pumping system should be carefully selected and considered in order to ensure an enough suction head required by the pump. If the position of the pump is too high, even above the water level in the aquarium, additional water should be filled into the suction port of the pump to provide a proper NPSH (Net Positive Suction Head) required by the pump for starting the pump operation, thereby causing inconvenience for the user.
3. It is lacking of device or mechanism for preventing backflow of water into the aquarium especially when meeting power failure of the pump; and it is also lacking of filtering device or cleaning device for filtering unexpected matters or removing dirts existing in the recycled water between the tank, the pump and the aquarium.

The present inventor has found the drawbacks of the conventional water pumping system of aquarium and invented the present aquarium pumping system with enough suction head.

SUMMARY OF THE INVENTION

The object of the present invention is to provide an aquarium pumping system including: a container having a pump installed in the container and having sand filled in the container, a discharge tube connected between the container and an aquarium for delivering water into the aquarium, a suction tube connected between an aquarium and a suction port of the pump with the suction tube having an inlet aperture formed in the suction tube and submerged in the container under a water level within the container for constantly filling water fully into the suction tube through the inlet aperture to obtain an enough net positive suction head (NPSH) of the pump, and a gas tube connected to the container for supplying carbon dioxide gas into the container to react with calcium carbonate existing in the sand to form calcium ions which will be dissociated into the water and delivered into the aquarium for raising fish, coral or other animals in the aquarium.

DETAILED DESCRIPTION

Figure 2:
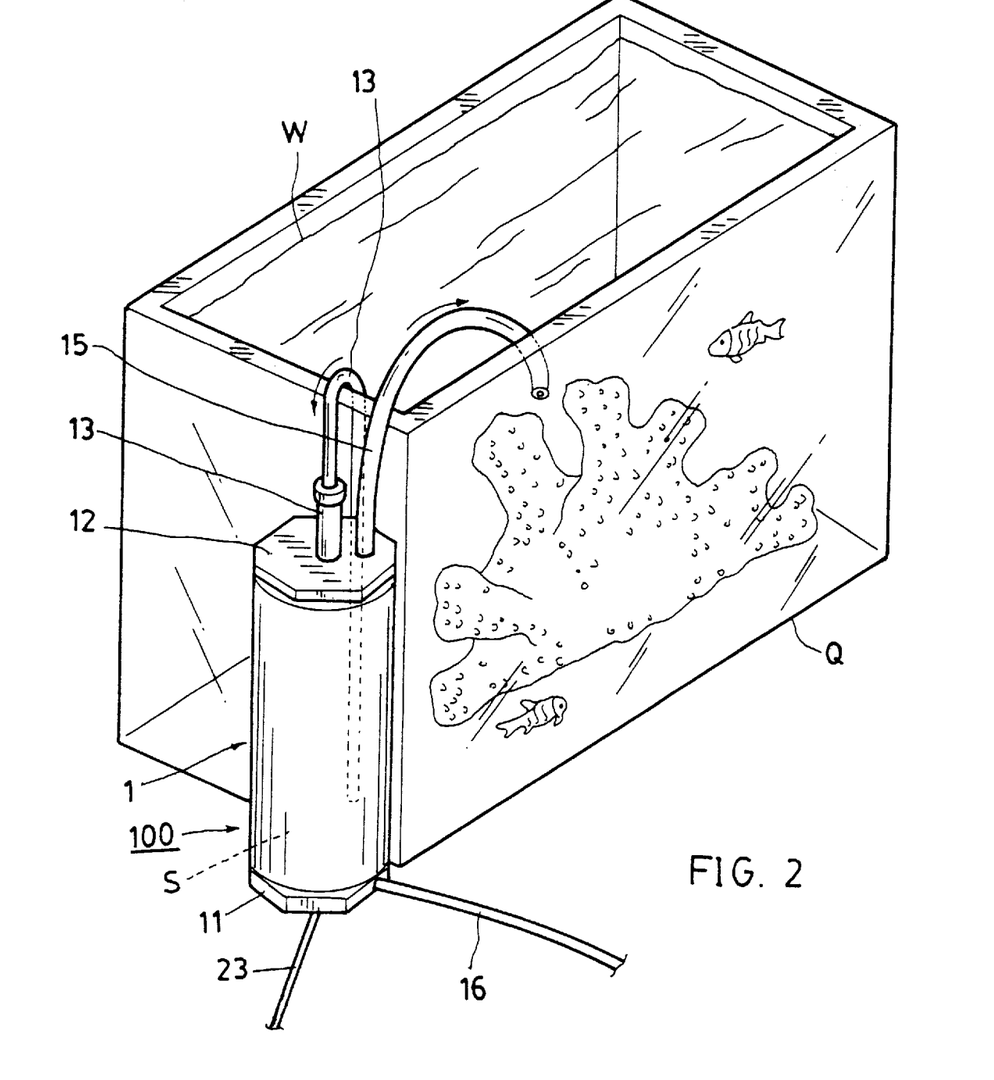
FIG. 2 is an illustration showing a pumping system in accordance with the present invention.
Figure 3:
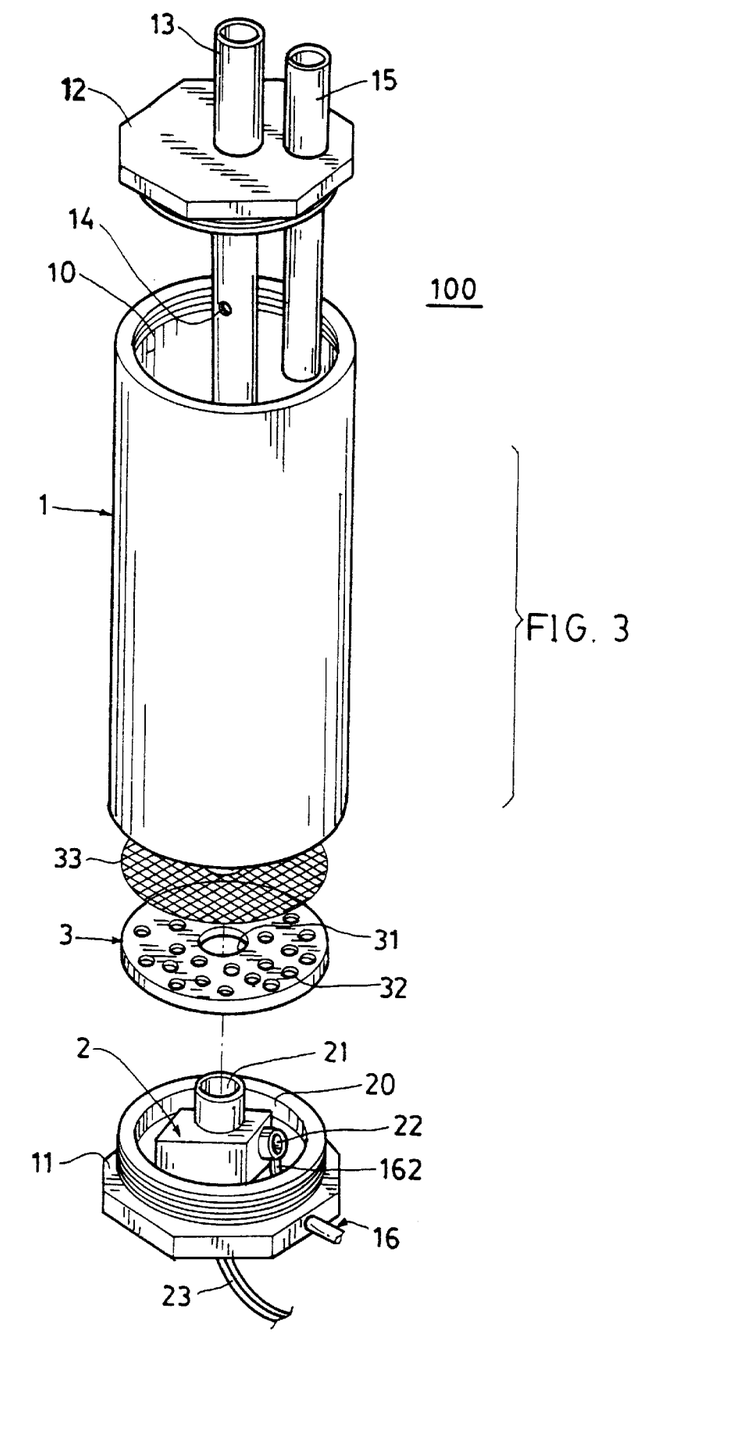
FIG. 3 is an exploded view of the present invention.
Figure 4:
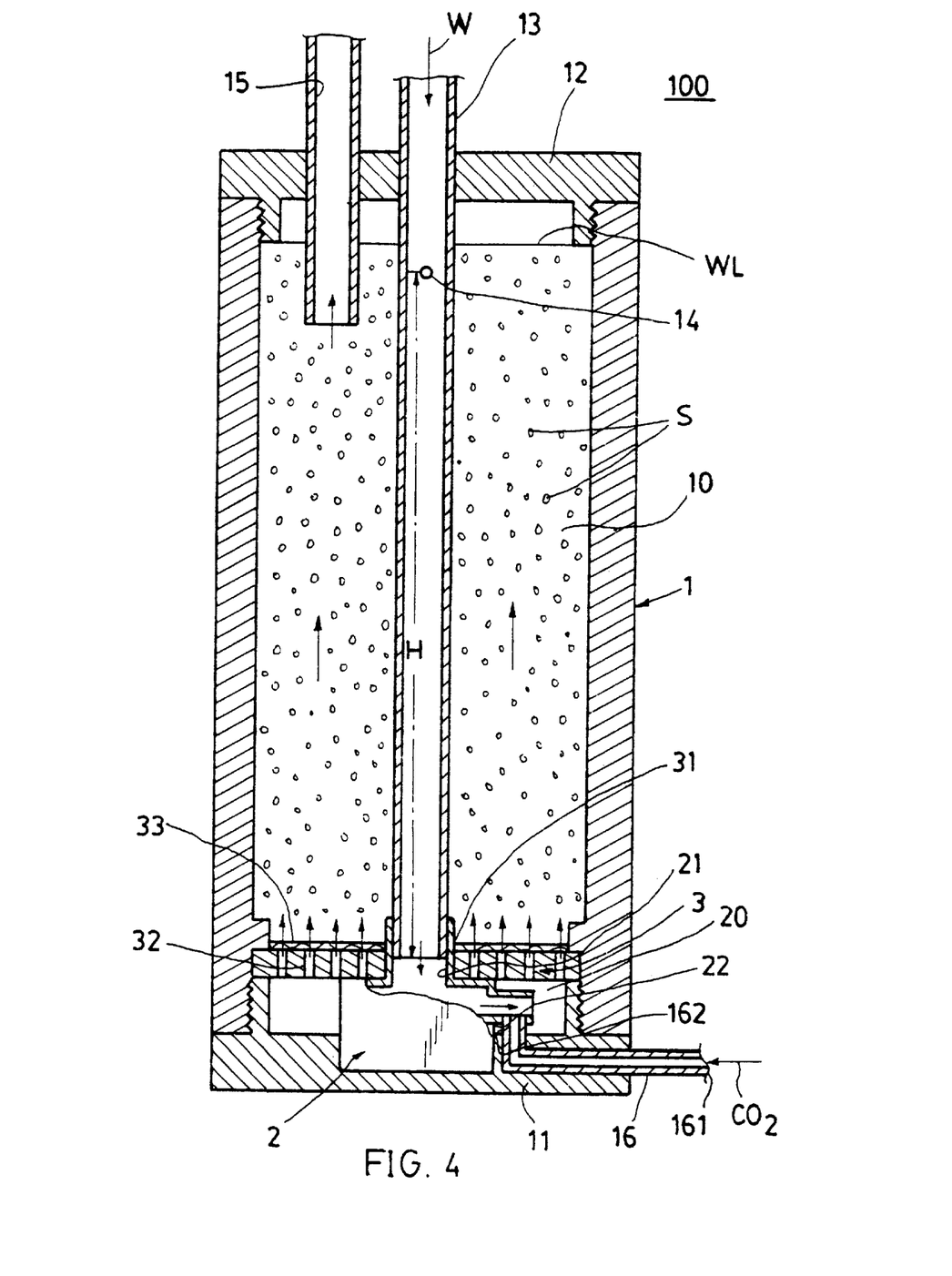
FIG. 4 is a sectional drawing of the present invention when assembled.

As shown in FIGS. 2–4, the aquarium pumping system 100 of the present invention comprises: a container 1, which may be cylindrical shaped, but not limited in this invention, a pump 2 installed in the container 1 preferably in a lower portion of the container 1, and at least a filter 3 provided in the container for filtering dirts or for precluding entrance of sand S (in the container 1) into the pump 2.

The container 1 may be filled with sand S or other fillers in an interior 10 in the container and may be mounted on any suitable location on or adjacent to an aquarium Q as shown in FIG. 2.

The container 1 includes: a bottom cover 11 fixed at a bottom of the container 1, an upper cover 12 fixed at a top of the container 1 for defining an interior 10 between the upper and bottom covers 12, 11 for filling sand S or other materials (nutrients) in the interior 10, a suction tube 13 connected between the pump 2 and the aquarium Q for directing water W from the aquarium into the container 1, an inlet aperture 14 formed in the suction tube 13 and submerged in water W as filled in the container 1 to be positioned below a water level WL of the water W in the container 1 preferably positioned adjacent to the upper cover 12 to have a proper height H of "water column" as formed by constantly filling water fully in the suction tube 13 between the inlet aperture 14 and a suction port 21 of the pump 2 above the pump 2 to obtain an enough net positive suction head (NPSH) required by the pump 2, a discharge tube 15 connected between the container 1 and the aquarium Q for delivering water in the container 1 into the aquarium, and at least a gas tube 16 connected between the container 1 and a gas supply source (not shown) for supplying a gas (such as carbon dioxide) into the container to react with at least a constituent in the water (such as carbon cabonate) to dissociate some nutrients (such as calcium ions) in the container into a water stream which is delivered into the aquarium Q through the discharge tube 15 as boosted by the pump 2.

The sand S as filled in the container 1 contains calcium carbonate which will be dissociated to form calcium ions by the following equation:

$$CaCO_3 + H_2O + CO_2 \rightleftharpoons Ca^{++} + 2HCO_3^{-}$$

The carbon dioxide as supplied through the gas tube 16 is reacted with the calcium carbonate to produce calcium ions which are dissociated into water W delivered to the aquarium for raising fish, coral and other animals in the aquarium. Other nutrients may be donated by selecting other suitable filler materials in the container 1.

The pump 2 includes a suction port 21 connected to the suction tube 13 which is inserted into the container 1 to longitudinally pass through the interior 10 in the container 1, a discharge port 22 for boosting water as pumped through the pump 2 into a discharge chamber 20 which may be located at a bottom portion of the container 1, and an electric wire 23 electrically connected between the pump 2 and a power supply source (not shown) for powering the pump for pumping water into the aquarium.

For precluding entrance of sand S into the discharge chamber 20 of the pump, a bottom filter 3 provided with screen 33 with fine mesh is retained between the discharge chamber 20 and the sand S as filled in the container 1 (FIG. 4) for a well maintenance of the pump 2.

The filter 3 is formed with a central opening 31 engageable with the suction tube 13 generally secured at a longitudinal center of the container 1, and a plurality of perforations 32 through the filter 3 for filtering dirts or precluding sand S.

Figure 5:
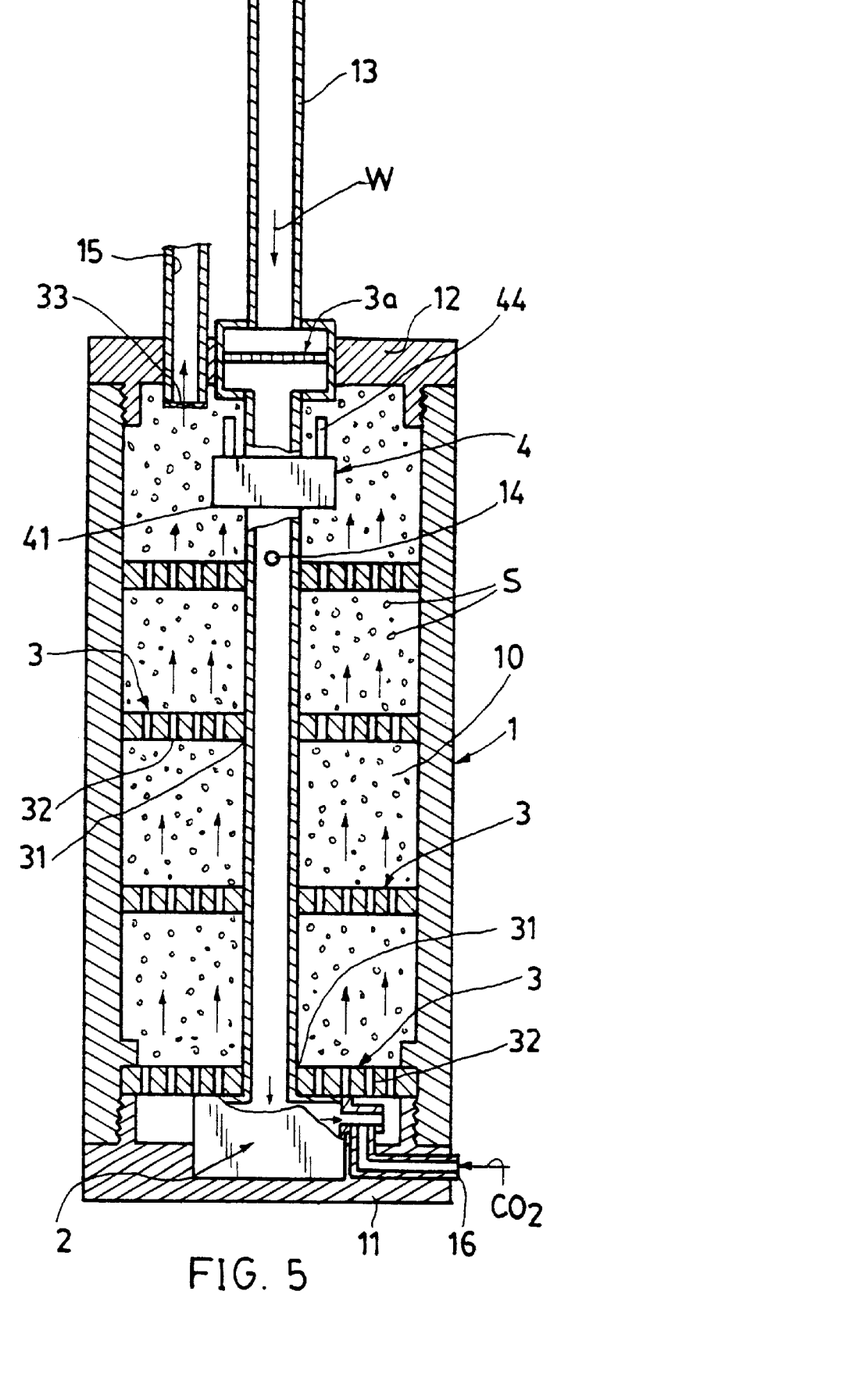
FIG. 5 is a sectional drawing of the present invention provided with filters and check valve.

As shown in FIG. 5, a plurality of filters 3 are juxtapositionally mounted in the container 1 for efficiently filtering dirts laden in the water W.

The gas tube 16 has an outer end 161 connectable to a gas (e.g. $CO_2$) supply source, and an inner end 162 connected with the discharge port 22 and communicated with the discharge chamber 20 for directing gas ($CO_2$) into the container 1 as drafted by an outlet water stream as pumped outwardly by the pump 2 through the discharge port 22 of the pump 2.

In FIG. 5, an internal filter or screen 3a is secured in the suction tube 13 for filtering dirts existing in the water stream W as sucked through the suction tube 13.

Figure 6:
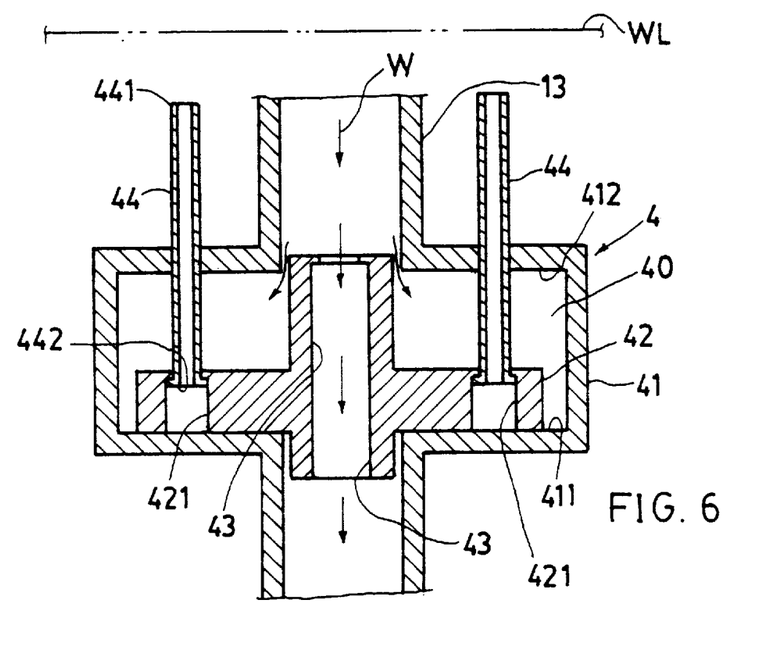
FIG. 6 shows a normal water delivery in the suction tube through the check valve of the present invention.
Figure 7:
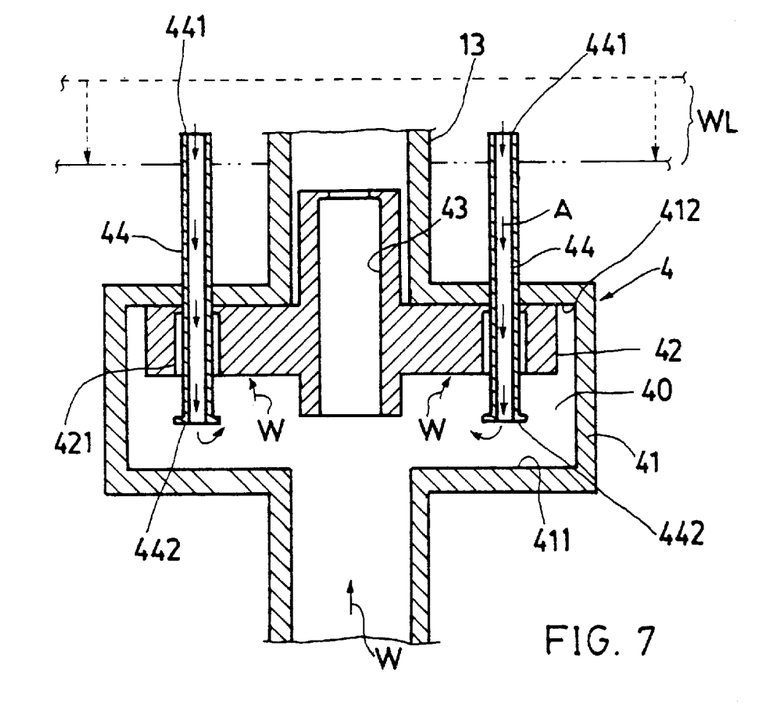
FIG. 7 shows a prevention of backflow of water through the check valve in the suction tube.

For preventing backflow of water into the aquarium through the suction tube 13 such as when meeting power failure of the pump, a check valve 4 may be provided on the suction tube as shown in FIGS. 5–7.

The check valve 4 includes: a valve casing 41 integrally formed on the suction tube 13 above the inlet aperture 14 and defining a valve interior 40 within the valve casing 41 having a bottom wall 411 and an upper wall 412 respectively disposed on a bottom and an upper portion of the valve casing 41, a valve disk 42 having a central tube 43 slidably held in the suction tube 13 and having a pair of guiding holes 421 formed on opposite side portions of the disk 42 for slidably engaging a pair of venting tubes 44 which are fixed on opposite side portions of the valve casing 41 to allow an upward and downward movement of the valve disk 42 in the interior 40 of the valve casing 41, with each venting tube 44 having an upper port 441 formed on a top end of the venting tube protruding upwardly above the valve casing 41 and a bottom port 442 formed at a bottom end of the venting tube 44 communicating with the interior 40 of the valve casing 41 when the valve disk 42 is upwardly floated by a backflow water stream W in the suction tube 13 (FIG. 7) and rested upon the upper wall 412 of the valve casing 41.

Upon a normal suction of water into the suction tube by the pump 2, the valve disk 42 will be driven downwardly by the water W as shown in FIG. 6 to close the bottom port 442 of each venting tube 44 to preclude air entrance through the venting tube 44 and the water W will be sucked downwardly by the pump 2 through the suction tube 13; and upon a backflow of water W (FIG. 7), for instance, when a power failure is caused to the pump, the water will be backwardly drafted by siphon effect into the aquarium if the container is mounted higher than the water level of the aquarium and the valve disk 42 will be driven upwardly to open the bottom port 442 of each venting tube 44 to allow air to enter the valve interior 40 through the venting tube with respect to a lowering of the water level WL in the container (FIG. 7) to thereby interrupt the backflow of water.

Since the suction tube 13 below the inlet aperture 14 is always filled with water therein to maintain an enough NPSH (Net Positive Suction Head) for the pump 2, the pump 2 will always be smoothly started and operated for sucking water from the suction tube 13 and the aquarium and for boosting water into the discharge chamber 20 and the interior 10 of the container 1 to be contacted with the sand S and the CO gas for forming calcium ion as dissociated from the sand, whereby the water containing calcium ion is delivered into the aquarium through the discharge tube 15 for enriching the calcium nutrient for raising the fish, coral or other animals in the aquarium.

Due to the inlet aperture 14 formed in the suction tube 13 at a position below the water level, the suction tube 13 will be always filled with water to maintain enough NPSH as required by the pump, thereby preventing cavitation or no-load running of the pump and minimizing damage of the pump.

The filters 3, 33, 3a provided in the container 1 or in the tube 13 will filter off the dirts for cleaning the water recirculated between the container and the aquarium.

The check valve 4 will prevent any backflow or reverse-flow of water into the aquarium to ensure a smooth water pumping system for the aquarium for enhancing the reliability of the pumping system and for well maintaining the animal lives in the aquarium.

Figure 8:
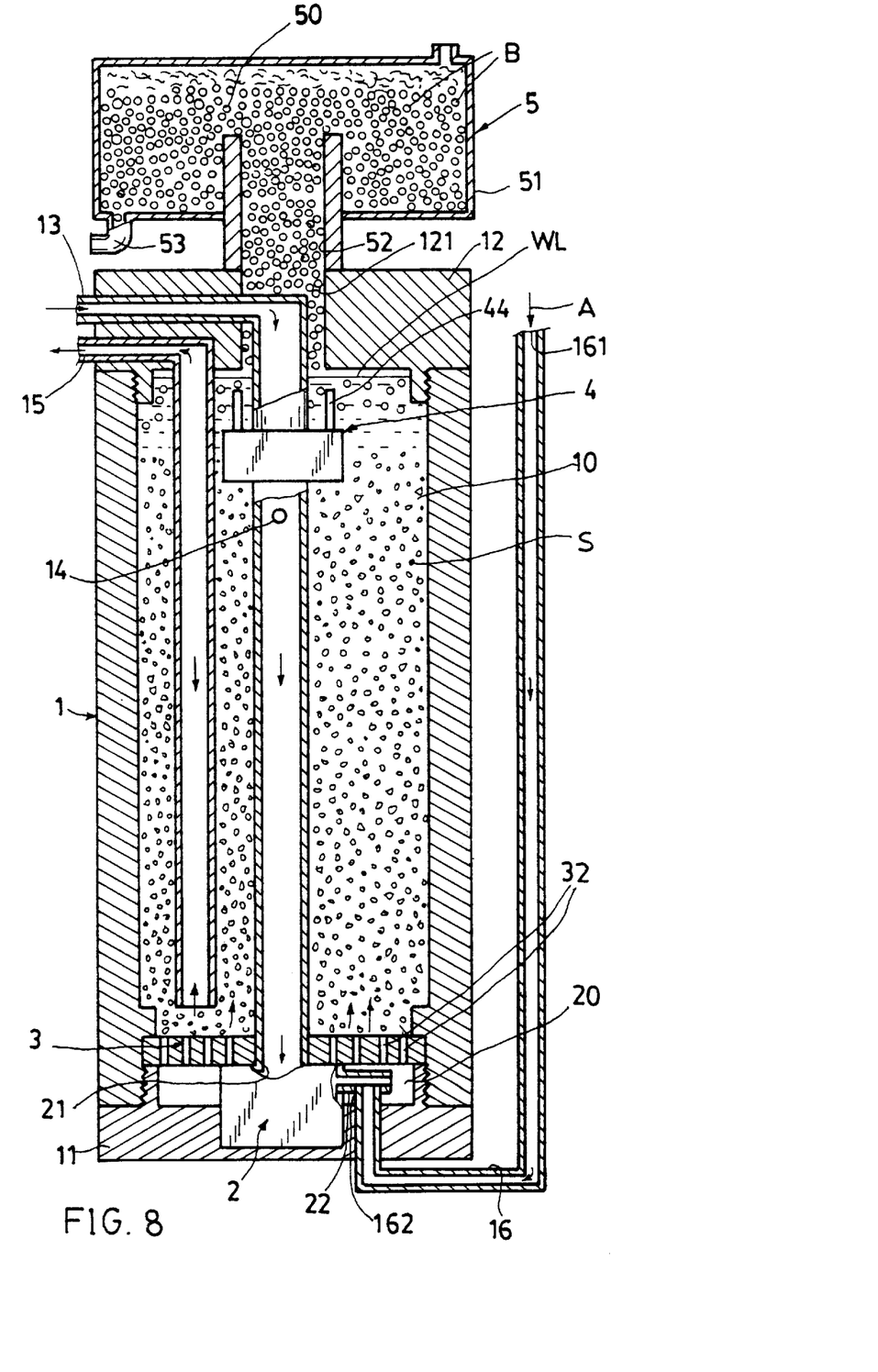
FIG. 8 is a sectional drawing of another preferred embodiment of the present invention.

Another preferred embodiment of the present invention is shown in FIG. 8 by further incorporating a bubbling means 5 in the aquarium pumping system as aforementioned. Such a bubbling means 5 may be added on the foregoing pumping system 100 for further collecting and removing particulate organic waste materials or dirts as suspended or contained in the water stream as recirculated in the system 100.

The bubbling means 5 includes: a collecting tank 51 mounted on and above the container 1 having a riser tube 52 connected to a top port 121 formed through the upper cover 12 for fluidically communicating a tank interior 50 within the collecting tank 51 with the interior 10 of the container 1; a gas tube 16 having an inner end 162 connected to a discharge port 22 of the pump 2 and having an outer end 161 communicated with an environmental air or an air supply source (or even a compressed air source); and a drain tube 53 formed at a bottom portion of the collecting tank 51 and communicated with the tank interior 50; whereby upon operation of the pump 2 to pump water upwardly through the discharge port 22 to draft the air A through the gas tube 16 to form fine bubbles B which will float upwardly through the perforations 32 formed in the filter 3 to carry, lade or suspend the particulate organic (including protein) waste materials, dirts, or suspension matters upwardly, whereby the particulate waste materials will be driven by the bubbles into the collecting tank 51 and drained through the drain tube 53 for removing such particulate organic waste materials for cleaning the water W as recirculated in the aquarium pumping system.

The particuate organic dirts are carried on air bubbles B by surface tension of the bubbles and floated upwardly to be removed from the collecting tank 51 of the bubbling means 5. This may further clean the water in addition to the filtration as aforementioned.

Upon an initial pumping operation of the pump 2 with the suction tube 13 pre-filled with air therein, the air in the suction tube will be sucked by the pump 2 to produce vacuum within the tube, thereby automatically drafting water into the tube 13 through the aperture 14 to fill the tube section between the aperture 14 and the suction port 21 of the pump for building up the suction head (NPSH) for the pump.

The present invention having enough suction head and having cleaning devices is superior to any conventional aquarium pumping system for preventing cavitation of the pump and for well cleaning the water as recirculated in the pumping system.

The present invention may be modified without departing from the spirit and scope of this invention.

I claim:

1. An aquarium pumping system comprising:

a container securable to an aquarium;

a pump installed in the container having a suction port for sucking water into said pump and a discharge port for delivering water outwardly as boosted by said pump;

a suction tube having an outer end thereof connected to and fluidically communicated with said aquarium and having an inner end of said suction tube connected to said suction port of said pump, said suction tube having a tube section submerged in a water level in said container adjacent to an upper cover of said container when filled with water; and a discharge tube connected between said container and said aquarium for discharging water as delivered from said discharge port of said pump;

the improvement which comprises:

said suction tube having an inlet aperture formed therein, said inlet aperture of said suction tube positioned above said suction port of said pump and positioned below said water level in said container when filled with water for constantly filling water fully into said tube section of said suction tube through said inlet aperture for obtaining a net positive suction head as required by said pump for preventing cavitation of said pump; and said suction port of said pump connected to the suction tube which is inserted into the container to longitudinally pass through an interior in the container, said discharge port boosting water outwardly as pumped through the pump into a discharge chamber which is located at a bottom portion of the container, and an electric wire electrically connected between the pump and a power supply source for powering the pump for pumping water into the aquarium.

2. An aquarium pumping system according to claim 1, wherein said container includes a filter retained between the discharge chamber and a filler of sand as filled in the container for precluding entrance of sand in the container into the discharge chamber of the pump.

3. An aquarium pumping system according to claim 1, wherein said container is juxtapositionally fixed with a plurality of filters therein; each said filter formed with a central opening engageable with the suction tube generally secured at a longitudinal center of the container, and a plurality of perforations formed through the filter for filtering dirts.

4. An aquarium pumping system according to claim 1, wherein said container further includes a gas tube having an inlet end connectable to a gas supply source, and an inner end connected with the discharge port of said pump and communicated with a discharge chamber of said pump for directing a gas directed from said gas tube into the container as drafted by an outlet water stream through the discharge port of the pump as pumped by the pump.

5. An aquarium pumping system according to claim 4, wherein said gas tube is supplied therein with carbon dioxide.

6. An aquarium pumping system according to claim 1, wherein said suction tube includes an internal filter secured in the suction tube for filtering dirts existing in a water stream as sucked through the suction tube.

7. An aquarium pumping system according to claim 1, wherein said suction tube is formed thereon with a check valve, said check valve including: a valve casing integrally formed on the suction tube above the inlet aperture and defining a valve interior within the valve casing having a bottom wall and an upper wall respectively disposed on a bottom and an upper portion of the valve casing, a valve disk having a central tube slidably held in the suction tube and having a pair of guiding holes formed on opposite side portions of the disk for slidably engaging a pair of venting tubes which are fixed on opposite side portions of the valve casing to allow an upward and downward movement of the valve disk in the interior of the valve casing, with each said venting tube having an upper port formed on a top end of the venting tube protruding upwardly above the valve casing and a bottom port formed at a bottom end of the venting tube communicating with the interior of the valve casing when the valve disk is upwardly floated by a backflow water stream in the suction tube and rested upon the upper wall of the valve casing for opening said bottom port of said venting tube to direct air from the upper port of said venting tube into the interior of the valve casing through the bottom port of said venting tube for interrupting or preventing the backflow of water into the aquarium.

8. An aquarium pumping system according to claim 1, wherein said container is further provided therein a bubbling means including: a collecting tank mounted on and above the container having a bottom tube connected to a top port formed through an upper cover of the container for fluidically communicating a tank interior within the collecting tank with an interior of the container; a gas tube having an inner end connected to said discharge port of the pump and having an outer end of said gas tube communicated with an environmental air or an air supply source; and a drain tube formed at a bottom portion of the collecting tank and communicated with the tank interior; whereby upon operation of the pump to pump water upwardly through the discharge port to draft air through the gas tube to form fine bubbles floating upwardly through a plurality of perforations formed in at least a filter in said container, the particulate organic waste materials will be carried and suspended on the bubbles to be upwardly collected in the collecting tank and removed from the drain tube for disposal of the waste materials.

* * * * *